Figure 1:
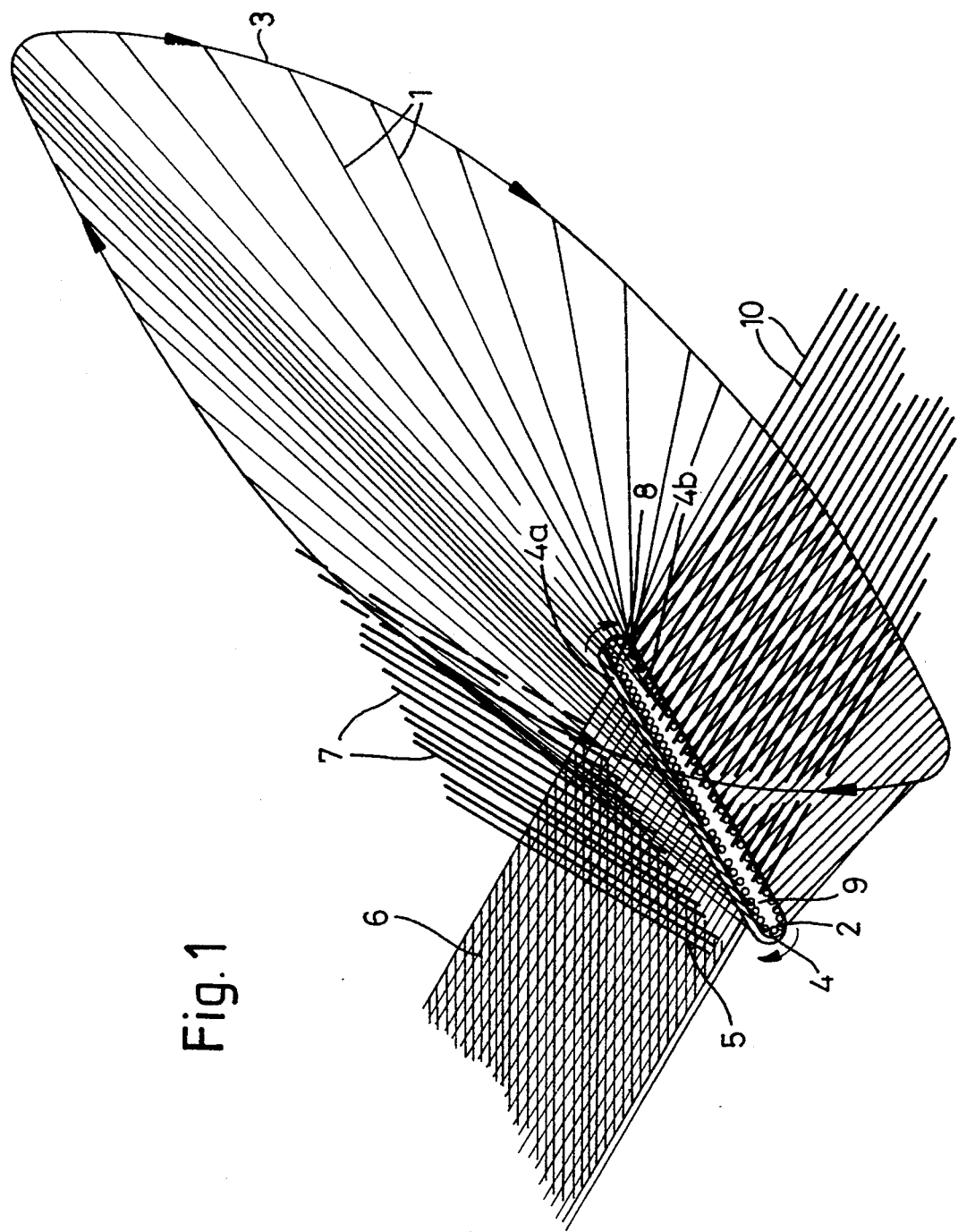

United States Patent [19]
Vane et al.

[11] Patent Number: 5,442,935
[45] Date of Patent: Aug. 22, 1995

[54] APPARATUS FOR PRODUCING MULTI-AXIAL NON-WOVEN FABRIC

[75] Inventors: Jeffrey A. Vane, Ascot; Colin J. Hallam, Andover, both of United Kingdom

[73] Assignee: Tech Textiles Holdings Ltd., Hampshire, United Kingdom

[21] Appl. No.: 35,762

[22] Filed: Mar. 24, 1993

[30] Foreign Application Priority Data

Mar. 25, 1992 [GB] United Kingdom ............... 9206512

[51] Int. Cl.$^6$ ...................... D04B 23/10; D04B 23/22; D04H 3/04
[52] U.S. Cl. ...................... 66/84 A; 28/101
[58] Field of Search .............. 66/83, 84 A, 85 A, 192; 28/101, 107

[56] References Cited
U.S. PATENT DOCUMENTS

| | | | |
|---|---|---|---|
| 3,493,455 | 2/1970 | Le Bolt | 28/101 X |
| 3,602,965 | 9/1971 | Burger | 28/101 |
| 3,620,868 | 11/1971 | Burger | 28/101 X |
| 3,646,647 | 3/1972 | Klein | 28/101 |
| 3,921,265 | 11/1975 | Eschenbach | 28/101 |
| 4,567,738 | 2/1986 | Hutson et al. | 66/192 X |
| 4,615,934 | 10/1986 | Ellison | 66/192 X |
| 4,872,323 | 10/1989 | Wunner | 66/192 X |
| 5,191,777 | 3/1993 | Schnegg | 66/192 X |

*Primary Examiner*—Clifford D. Crowder
*Assistant Examiner*—John J. Calvert
*Attorney, Agent, or Firm*—Finnegan, Henderson, Farabow, Garrett & Dunner

[57] ABSTRACT

The invention provides apparatus for producing multi-axial non-woven fabric comprising an endless series of yarn guides (3) having upper and lower reaches which extend widthwise of the apparatus and which are driven in opposite directions, rotatable creel means (2) for supplying yarns (1) to the yarn guides (3), the creel means (2) being driven in the same direction and at substantially the same speed as the endless series of yarn guides (3), and stitching means (5) for stitching the yarns (1) laid by the endless series of yarn guides (3).

17 Claims, 8 Drawing Sheets

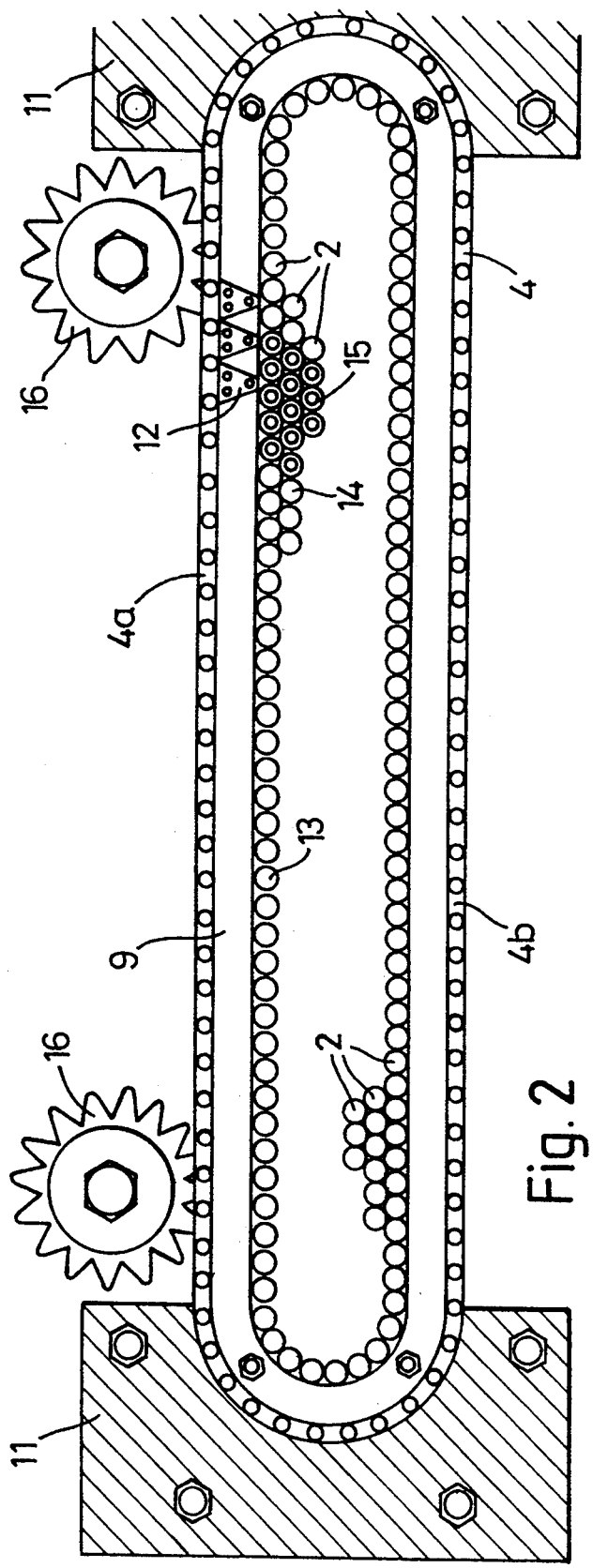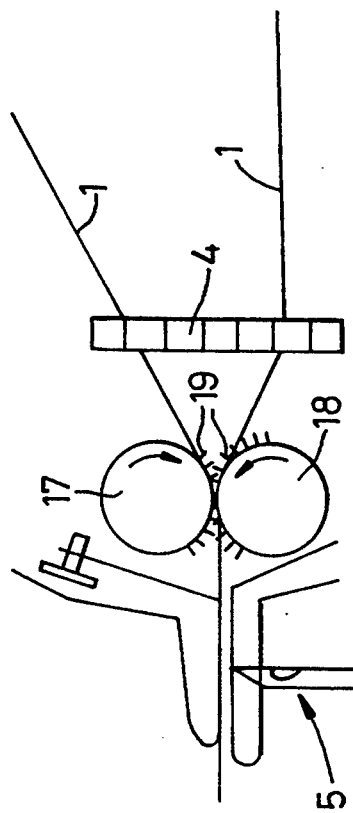

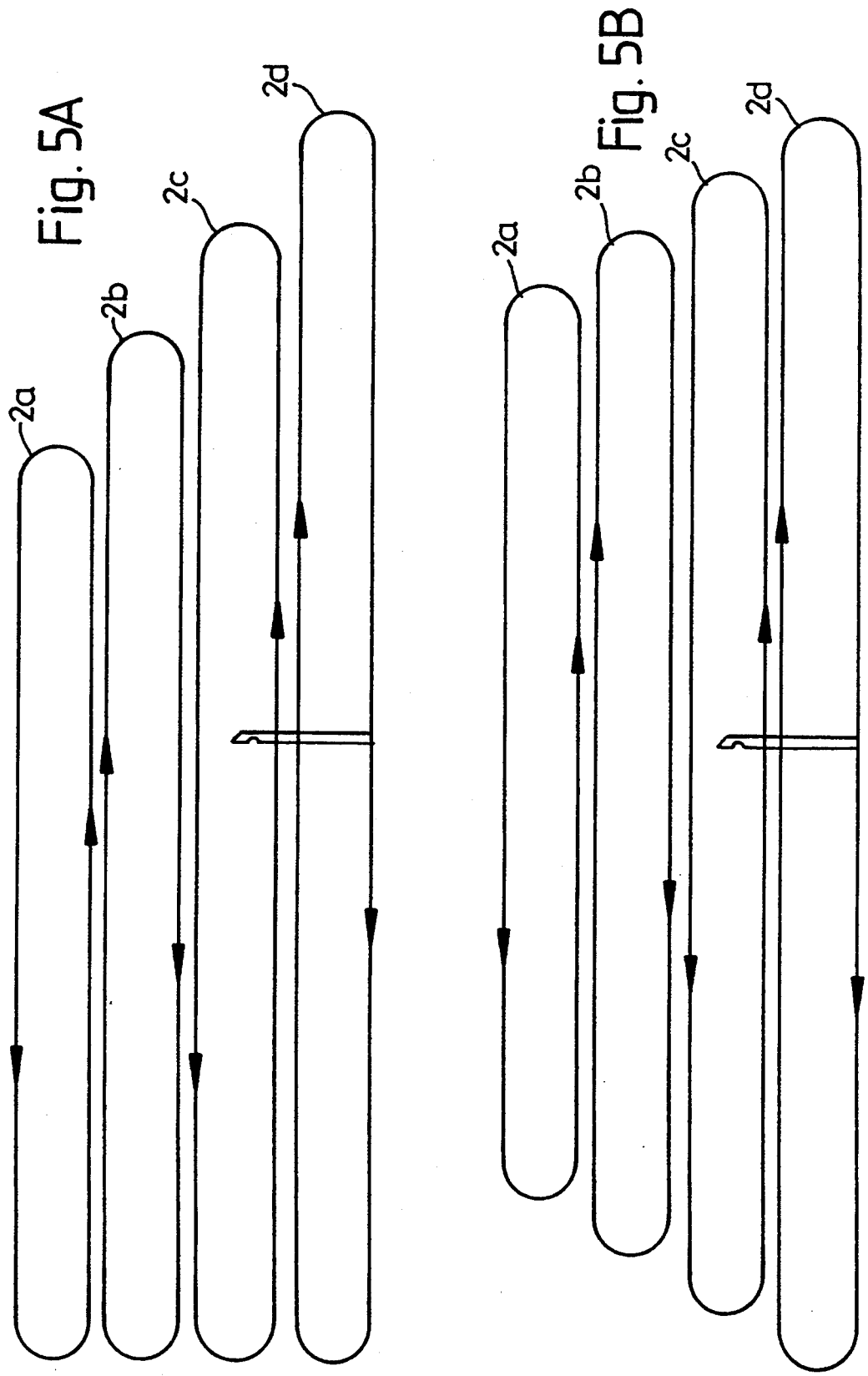

APPARATUS FOR PRODUCING MULTI-AXIAL NON-WOVEN FABRIC

This invention relates to apparatus for producing multi-axial non-woven fabric. The term "multi-axial non-woven fabric" as used herein and the claims hereof means a non-woven textile fabric comprising at least two layers, 611 of the yarns in each layer being substantially parallel to one another and the yarns in at least said two layers extending in different directions, and stitching extending through said layers, the stitching serving both to connect together said layers and to maintain the parallel arrangement of the yarns in each layer. Such fabrics are well-known in the arc and are generally used as reinforcements in articles made from reinforced plastics materials, although they can have uses In other areas such as in the manufacture of window blinds. Examples of such fabrics are those manufactured and sold under the Registered Trademark "COTECH" by Tach Textiles Limited of Andover, Hampshire, England.

The term "yarn" or "yams" as used herein and in the claims hereof means any yarn(s), thread(s), roving(s), tow(s) or fibre(s) whether these be monofilament or multifilament.

Generally, multi-axial non-woven fabrics of the kind defined are produced on apparatus comprising a pair of driven parallel endless chain conveyors which extend longitudinally of the apparatus on opposite sides thereof and each of which carries a series of pins, at least two guide rail means spaced longitudinally of the apparatus and extending above and across said chain conveyors, at least one of said guide rail means extending at an oblique angle with respect to said chain conveyors, a yarn carriage mounted on each of said guide rail means for movement therealong, each yarn carriage being adapted to carry a plurality of parallel yarns from one of said chain conveyors to the other during each traverse, shogging means associated with each yarn carriage for engaging the yarns with the pins of the appropriate chain conveyor at the end of each traverse and for ensuring that the yarns laid at each traverse are adjacent to and parallel with the yarns laid on the previous traverse whereby to form a layer of non-woven parallel yarns extending at a predetermined angle with respect to the longitudinal centreline of the fabric being formed, and a stitching head extending across the width of the apparatus to which the laid yams are transported by said conveyor chains, the stitching head serving to stitch together the layers laid by said yarn carriages so that the layers are held together and the parallelity of the yarns in each layer is maintained. In some cases means is provided for laying parallel warp yams on or between the layers formed by said yarn carriages, prior to said stitching, to form a layer of yarns extending at 0 degrees with respect to the longitudinal direction of the fabric.

With this known apparatus, except for any optional layer of warp yarns, a separate guide rail means, yarn carriage and shogging means is required for each layer of the finished fabric and the guide rail means, yarn carriages and shogging means of the different layers must be spaced longitudinally of the apparatus. Since it is not uncommon for multi-axial non-woven fabrics of the kind defined to comprise four or more layers, e.g., with the yarns in the different layers extending at 0 degrees, +45 degrees, −45 degrees and 90 degrees with respect to the longitudinal centreline of the fabric, it will be apparent that the known apparatus is usually of considerable length and occupies a considerable amount of valuable floor space.

There is accordingly a need for apparatus for producing multi-axial non-woven fabric as herein defined which is more compact and occupies less floor space than the known apparatus and the present invention has as its object to fulfil this need.

The present invention provides apparatus for producing multi-axial non-woven fabric as herein defined, the apparatus comprising an endless series of yarn guides having upper and lower reaches extending widthwise of the apparatus, means for driving said series of yarn guides whereby said upper and lower reaches travel in opposite directions, creel means for supplying yarns to said yarn guides, means for rotating said creel means in substantially the same direction and at substantially the same speed as said series of yarn guides to prevent tangling of the yarns supplied to the yarn guides, stitching means extending across the width of the apparatus for stitching together the yarns laid by said yarn guides, and transport means for transporting the laid yarns through said stitching means.

With the apparatus of the present invention, the yarns laid by the upper and lower reaches of the endless series of yarn guides form two superimposed layers of parallel yarns which extend at opposite but equal angles with respect to the longitudinal centreline of the fabric being formed, the layers being stitched together by said stitching means to hold the layers together and to maintain the parallelity of the yarns in each layer. The angle at which said yarns are laid relative to the longitudinal centreline of the fabric being formed is determined by the speed at which said series of yarn guides is driven relative to the speed of said transport means, which latter is dependant on the speed of operation of the stitching means. Changing the speed at which the endless series of yarn guides is driven relative to the speed of the transport means changes the angle of the yarns laid relative to the longitudinal centreline of the fabric being formed.

The apparatus of the present invention may comprise two or more endless series of yarn guides each having upper and lower reaches extending widthwise of the apparatus and said two or more endless series of yarn guides may be substantially parallel and arranged at different levels, e.g., one above the other.

Said two or more endless series of yarn guides may be of substantially the same length and extend across substantially the full width of the apparatus. Alternatively, two or more of said endless series of yarn guides may be of different length, whereby to produce a fabric in which the layers are "stepped" along one or both side margins. This latter is useful where the fabric being produced is a reinforcing fabric for plastics articles since it enables adjacent lengths of fabric to be overlapped without any appreciable increase in the thickness of the reinforcement.

If desired, the length of the or each said endless series of yarn guides may be adjustable while the apparatus is in operation to vary the width of the fabric being produced. This feature is useful since it enables a fabric to be produced which is shaped or tailored, e.g. to suit a mould for a particular reinforced plastics article so that the article can be readily produced without the need to trim or tease the reinforcing fabric to the shape of the mould and with little or no The or each said endless series of yarn guides may be carried by an endless member such as an endless chain or band. Said endless chain or band may extend around spaced sprockets or pulleys, at least one of which may be driven, or may be mounted on a guide rail and driven by sprocket or like means.

The speed at which the or each said series of yarn guides is driven relative to the speed at which the laid yarns are transported through said stitching means may be variable to vary the angle at which the yarns are laid relative to the longitudinal centreline of the fabric being formed.

Said creel means may comprise at least one rotatable creel support having means for mounting a plurality of creels of yarn about the periphery thereof. The rotatable creel support may be in the form of a wheel, cylindrical frame or carousel. Said creel mounting means may be such that each creel is rotatable about its own axis and/or such that the axis of each creel remains vertical as the creel support is rotated.

Said stitching means may comprise knitting means.

Said transport means may comprise a driven take-up roller on which the formed fabric is wound and/or may comprise suitable conveyor means.

The apparatus of the present invention may further comprise collecting means for collecting yarns issuing from said yarn guides and passing them to said stitching means.

According to one embodiment of the invention, the collecting means comprises upper and lower driven rollers extending across the width of the apparatus, said rollers each having pins extending outwardly of the periphery thereof, the distance between said rollers being less than the length of said pins whereby the pins of each roller extend between the pins of the other roller at the nip of said rollers.

According to another embodiment, the collecting means comprises upper and lower endless conveyor belts of a width substantially the same as the width of the apparatus and each having pins extending from the outer surface thereof, the conveyor belts having opposed adjacent reaches which travel in the same direction towards said stitching means and which are spaced apart by a distance less than the length of said pins whereby the pins of each conveyor belt extend between the pins of the other conveyor belt in the region of said opposed reaches. Said conveyor belts may further comprise reaches which converge towards said opposed adjacent reaches.

In either of the aforesaid embodiments, said pins may be retractable.

The apparatus of the present invention may further comprise warp insertion means for inserting warp yarns extending longitudinally of the fabric being formed. Such warp insertion means may comprise at least one line of fixed yarn guides extending across the width of the apparatus, e.g. adjacent said stitching means for supplying warp yarns direct to the stitching means.

The apparatus of the present invention may further comprise left insertion means for inserting weft yarns extending normal to the longitudinal centreline of the fabric being formed. The weft insertion means may comprise a weft insertion carriage, e.g. mounted on said stitching means, reciprocatable across the width of the apparatus.

Figure 4:
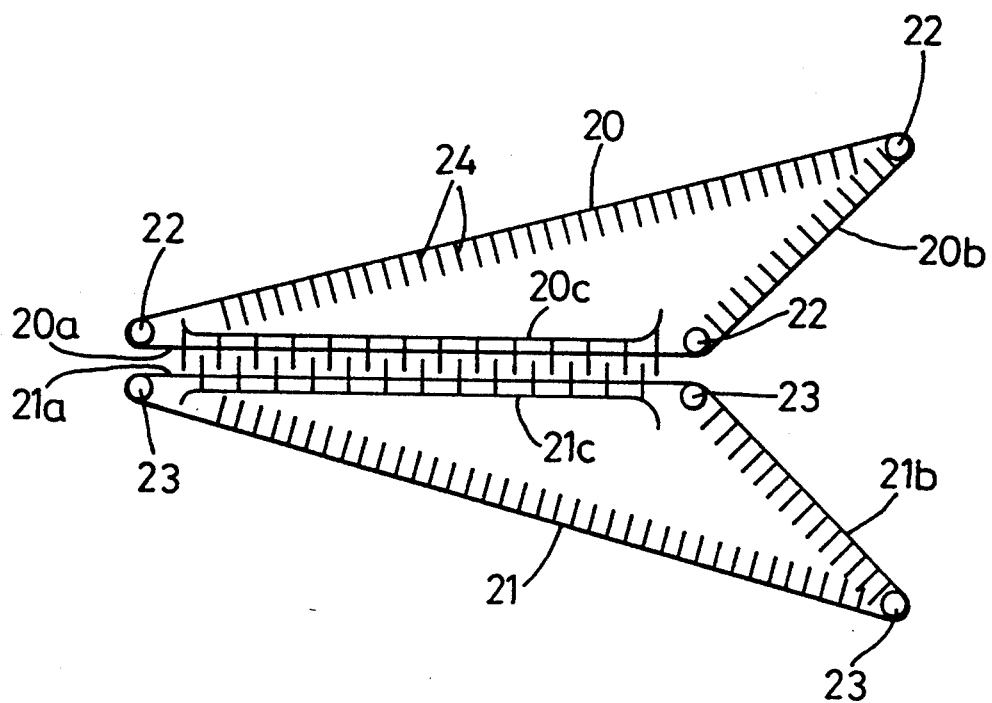
Figure 6A:
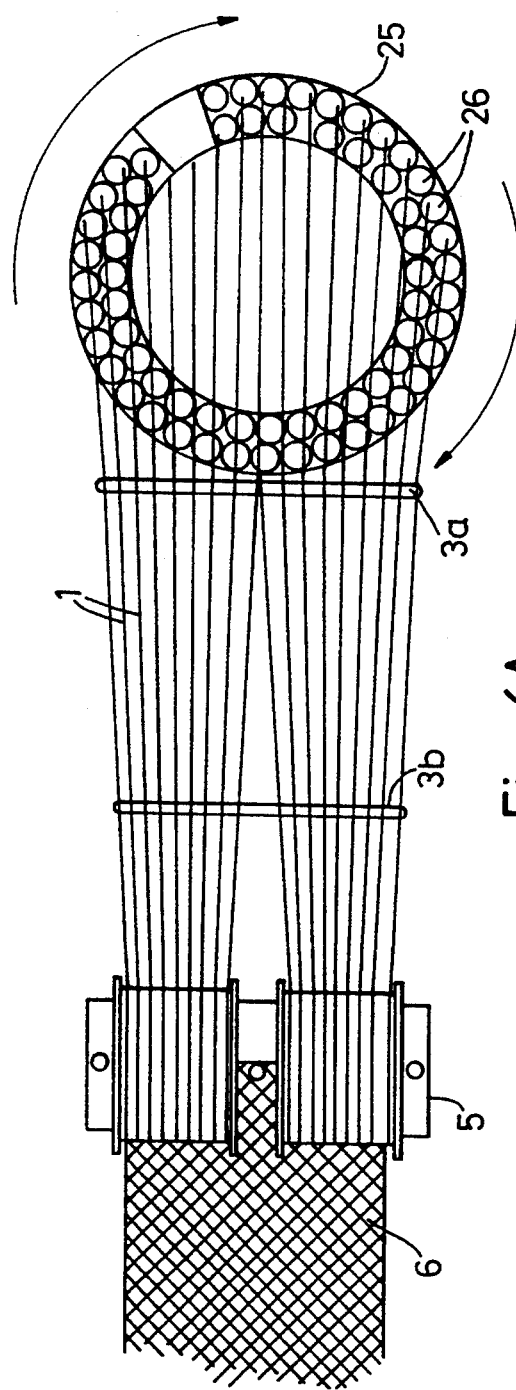
Figure 6B:
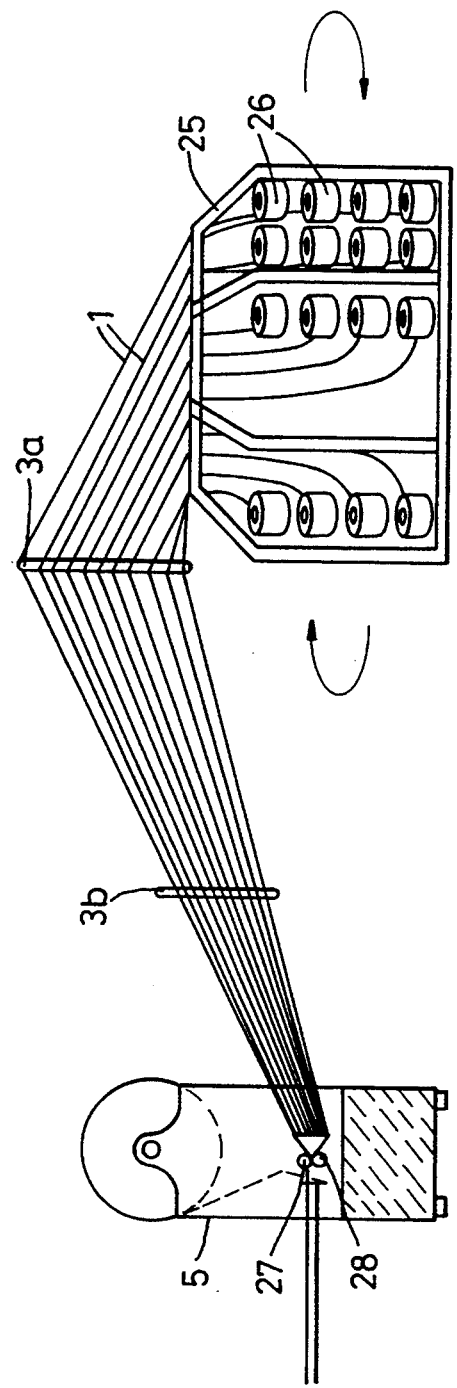
Figure 7A:
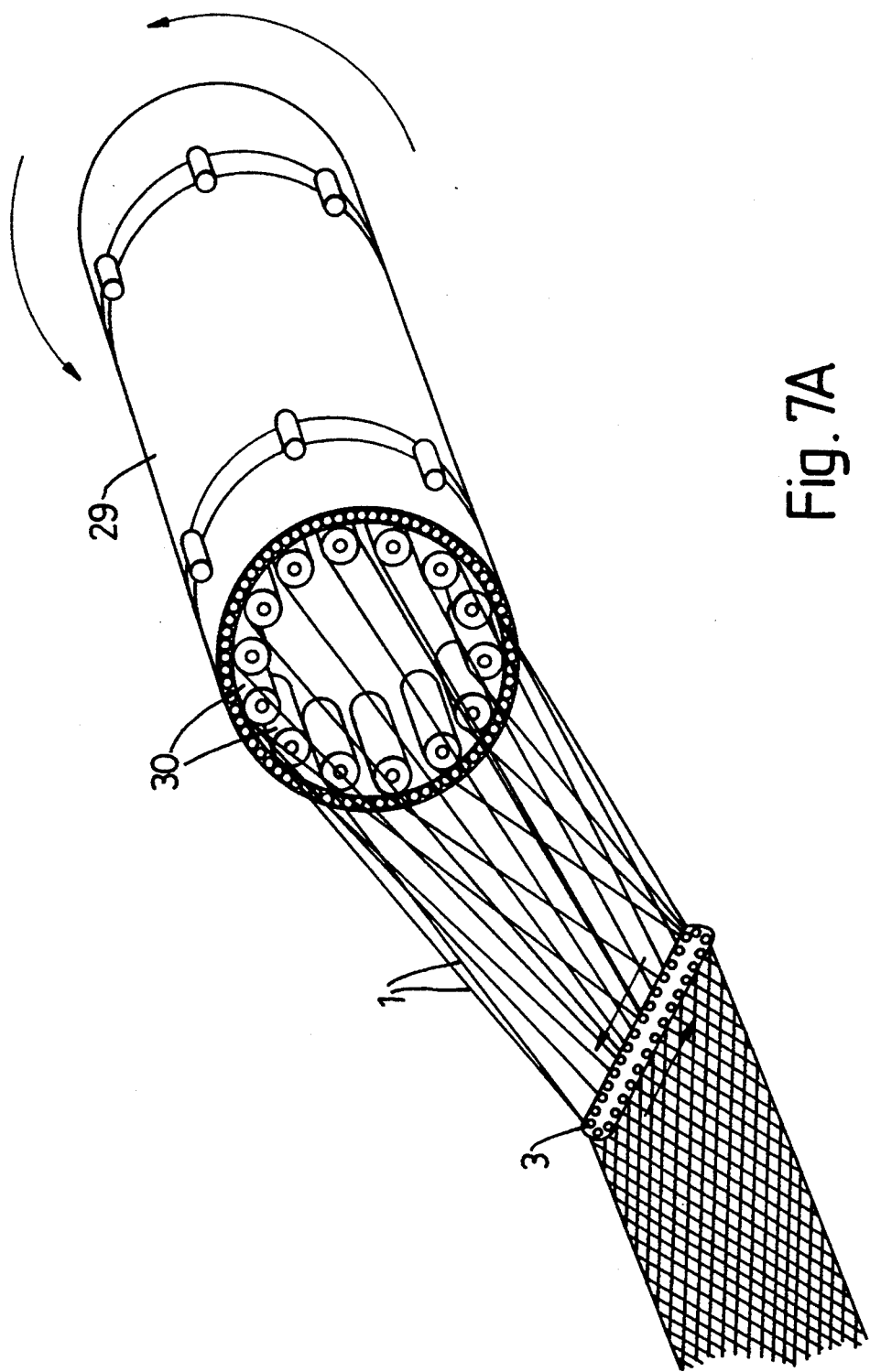
Figure 7B:
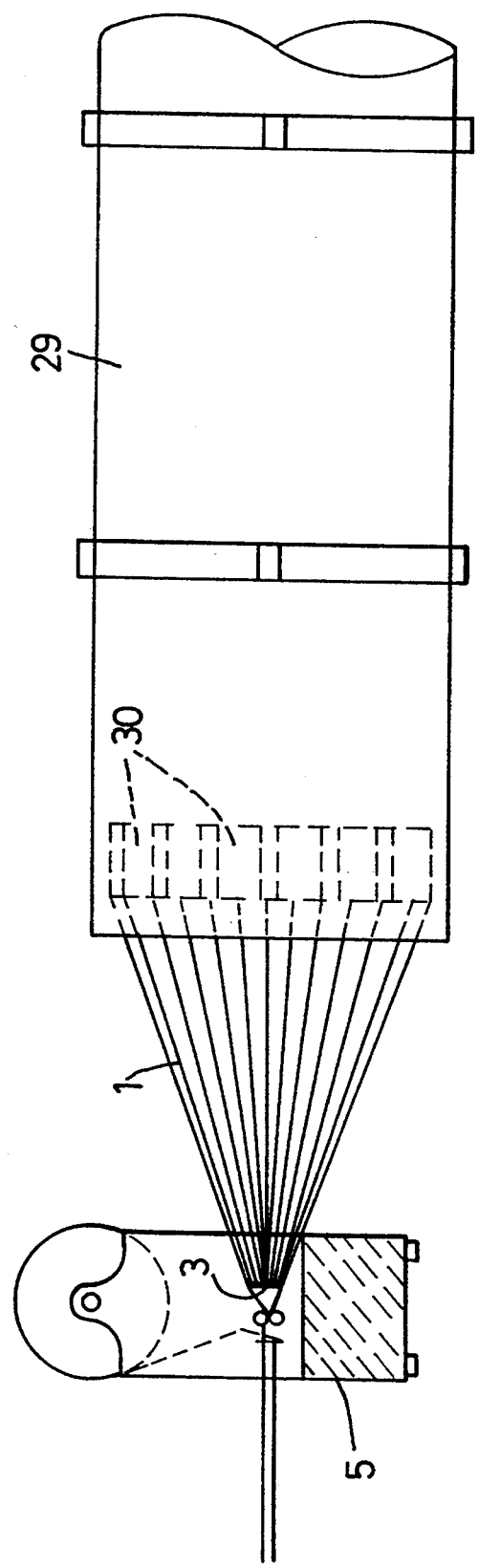
Figure 8:
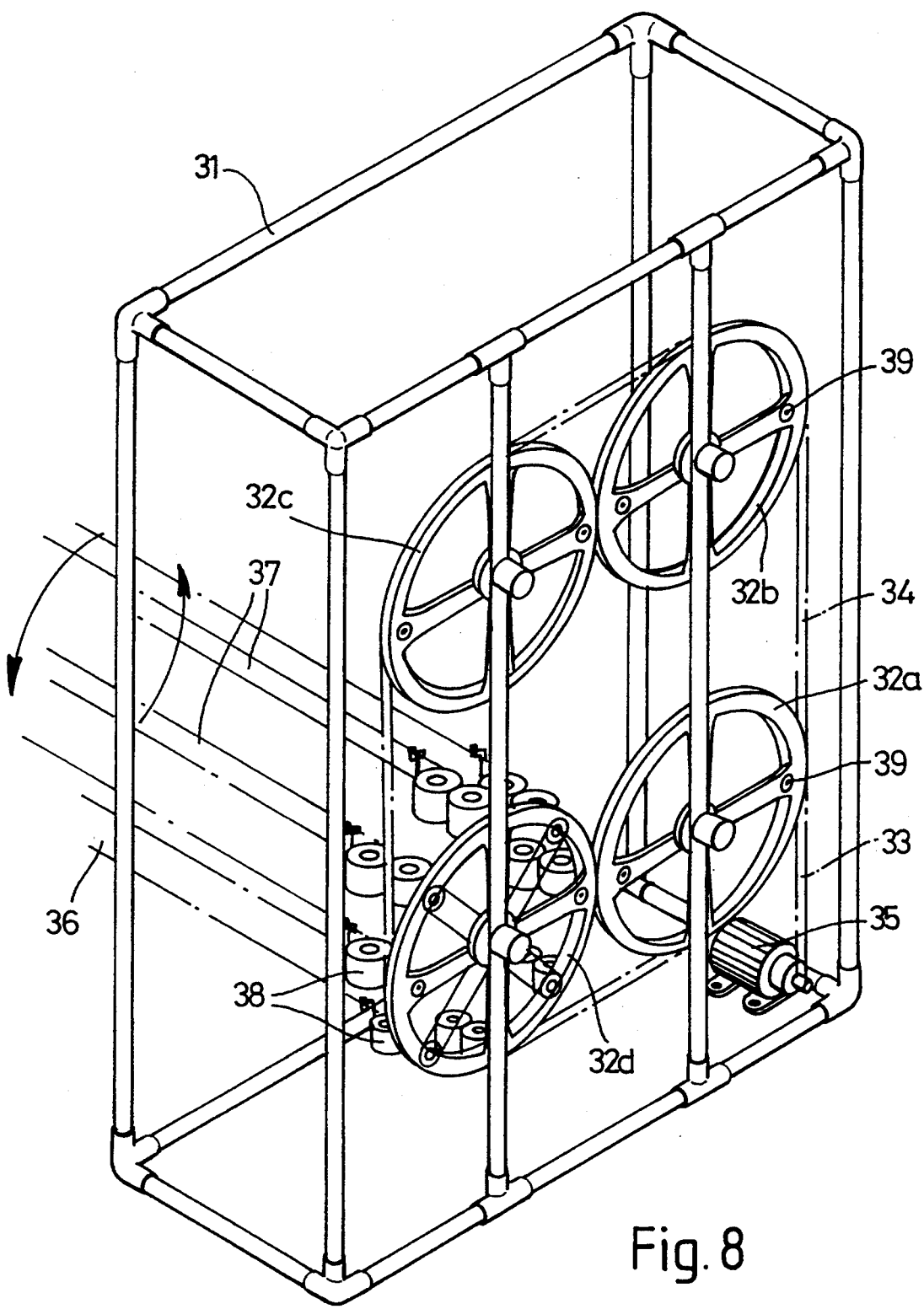

The invention will be further described with reference to the accompanying diagrammatic drawings, in which:

FIG. 1 illustrates the perspective view the operation of apparatus according to the present invention, FIG. 2 is a front elevation of an endless series of yarn guides according to an embodiment of the present invention, FIG. 3 is a side elevation of an embodiment of collecting means for collecting yarns issuing from an endless series of yarn guides and passing them to stitching means, FIG. 4 is side elevation of another embodiment of collecting means for collecting yarns issuing from am endless series of yarn guides and passing them to stitching means, FIGS. 5A and 5B Illustrate how apparatus according to the present invention may comprise a plurality of endless series of yarn guides arranged in parallel at different levels and how such endless series of yawn guides may be of different lengths, FIGS. 6A and 6B are a plan view and side view respectively of an embodiment of rotatable creel means according to the invention, FIGS. 7A and 7B are perspective and side views of another embodiment of rotatable creel means, and FIG. 8 is a perspective view of yet another embodiment of rotatable creel means.

Referring first to FIG. 1 it will be seen that yarns 1 from rotatable creel means 2 each pass through one of an endless series of yarn guides 3 carried by an endless chain 4 having upper and lower reaches 4a, 4b which extend widthwise of the apparatus. Yarns 1 having passed through the endless series of yarn guides 2 then pass to stitching means 5 which stitch bonds the two layers of yarns so formed together to form a fabric 6 in which the yarns 1 in each layer are parallel to one another and are maintained in parallelity by said stitching and wherein the yarns in the two layers extend at predetermined equal but opposite angles with respect to the longitudinal centreline of the fabric 6. The formed fabric 6 is conveyed to a take-up roller or other suitable storage means (not shown).

The angle at which the yarns 1 are laid by the endless series of yarn guides 2 relative to the longitudinal centreline of the fabric 6 is determined by the speed at which the yarn guides 2 are driven relative to the speed at which the laid yarns pass through the stitching means 5, this relative speed being variable to enable the angle at which the yarns 1 are laid to be varied as required.

The apparatus of the invention may optionally include warp insertion means for inserting warp yarns extending longitudinally of the fabric 6. Such warp insertion means may comprise a line of fixed yarn guides (not shown) for supplying a plurality of warp yarns 7 from above direct to the stitching means 5 and/or a line of fixed yarn guides 8 in a fixed guide rail 9 supporting the endless chain 4 for supplying a plurality of warp yarns 10 to the stitching means 5.

In the embodiment shown in FIG. 2, endless chain 4 having upper and lower reaches 4a, 4b, is mounted for rotation on a fixed guide rail 9 supported by frame members 11 and carries a series of brackets 12 which support an endless series of yarn guides 2 in the form of eyes of suitable ceramic or other hard wearing material. The yarn guides 2 may be arranged in a single row 13 or in a plurality of rows 13, 14, 15, etc., according to the number of yarns required in each layer of the finished fabric. Endless chain 4 is driven by sprockets 16.

The collecting means illustrated in FIG. 3 of the drawings comprises upper and lower rollers 17, 18 which extend across the width of the apparatus and are interposed between the endless chain 4 and the stitching means 5. Rollers 17, 18 are driven in opposite directions as indicated by the arrows and each has pins 19 extending outwardly of the periphery thereof. The spacing between the rollers 17, 18 is less than the length of the pins 19 so that the pins of each roller extend between the pins of the other roller.

The collecting means illustrated in FIG. 4 of the drawings comprises upper and lower conveyor belts 20, 21 which extend across the width of the apparatus and are interposed between the endless chain 4 and the stitching means 5. Conveyor belts 20, 21 extend around driven and idler rollers 22, 23 respectively and each has spaced spring-loaded pins 24 which are normally retracted and are caused to extend from the outer surface thereof by contact with cam plates 20c, 21c along reaches 20a, 21a to be described. Conveyor belt 20 has a reach 20a which is adjacent and opposite a reach 21a of conveyor belt 21, the reaches 20a, 21a travelling in the same direction towards the stitching means 5 and the distance therebetween being less than the length of the pins 24 so that the pins of each conveyor belt extend between the pins of the other conveyor belt in the region of the reaches 20a, 21a. Downstream of the reaches 20a, 21a the conveyor belts 20, 21 have reaches 20b, 21b which converge towards the reaches 20a, 21a. In an embodiment (not illustrated) cam plates 20c, 21c are extended to cause pins 24 to extend also along converging reaches 20b, 21b.

Referring now to FIGS. 5A and 5B, it will be seen that the apparatus of the present invention may comprise a plurality of endless series of yarn guides 2a, 2b, 2c ... 2n which are arranged at different levels, e.g. one above the other, so as not to interfere with one another and which as illustrated may be of different lengths so as to produce a fabric having one (FIG. 5A) or both (FIG. 5B) side margins "stepped". Separate creel means would, of course, be associated with each of the endless series of yarn guides 2a, 2b, 2c, etc.

The creel means illustrated in FIGS. 6A and 6B comprises a driven rotatable carousel 25 on which is mounted a plural try of creels 26 each rotatable about its own vertical axis. Yarns 1 drawn from the creels 26 pass through first and second endless series of yarn guides 3a, 3b, which are driven in the same direction and at the same speed as the carousel 25, before passing to the stitching means 5, which in this embodiment includes driven rollers 27, 28 for transporting the laid yarns through the stitching means 5.

The creel means illustrated in FIGS. 7A and 7B comprises a cylindrical frame 29 rotatable about its longitudinal axis and having a plurality of creels 30 mounted about its periphery over the length thereof. Yarns 1 from the creels 30 pass through an endless series of yarn guides 3, driven in the same direction and at the same speed as the cylindrical frame 29, to the stitching means 5.

The creel means illustrated in FIG. 8 comprises 8 frame 31 having rotatably mounted thereon four sprocket wheels 32a, 32b, 32c, 32d driven by chains 33, 34 from a motor 35. Mounted on each of the sprocket creels 32 is a cylindrical frame 36 (only one of which is shown) having longitudinal frame members 37 spaced about the periphery thereof. Each of the frame members 37 has 8 plurality of creels 38 spaced along the length thereof. Frame members 37 are themselves rotatable about their longitudinal axes by suitable gear means 39 contained within the sprocket wheels 32 to maintain the axes of the creels 38 vertical as the sprocket wheels 32, and hence the cylindrical frames 36, are rotated. As with the previous embodiments, yarns 1 from the creels 38 pass through endless series of yarn guides (not shown) to stitching means (not shown).

From the foregoing description it will be understood that the apparatus of the present invention is not only more compact and occupies less floor space than the known apparatus for producing multi-axial non-woven fabric but that each endless series of yarn guides enables two layers of the finished fabric to be produced in a single operation.

Where the multi-axial non-woven fabric is intended for use as a reinforcing fabric for reinforced plastics articles, the yarns 1 may be of glass fibre, carbon fibre, Aramid fibre, or any other fibre or material used as reinforcements for plastics. Furthermore, if desired, the yarns of reinforcing material may be interspersed with yarns of thermoplastic material in required proportions to produce a fabric which simply requires heating in a mould to produce a reinforced thermoplastics article.

We claim:

1. Apparatus for producing multi-axial non-woven fabric, the apparatus comprising a series of yarn guides having upper and lower reaches extending widthwise of the apparatus, means for driving said series of yarn guides wherein said upper and lower reaches travel in opposite directions, creel means for supplying yarns to said yarn guides, means for rotating said creel means in a substantially same direction and at a substantially same speed as said series of yearn guides to prevent tangling of the yarns supplied to the yarn guides, collecting means substantially continuously extending across the width of the apparatus for collecting the yarns issuing from said yarn guides and passing said collected yarns to a stitching means which extends across the width of the apparatus for stitching together the yarns laid by said yarn guides, and transport means for transporting the laid yarns through said stitching means.

2. Apparatus according to claim 1, comprising two or more of said series of yarn guides, each having upper and lower reaches extending widthwise of the apparatus, said two or more series of yarn guides being substantially parallel and with respect to one another.

3. Apparatus according to claim 2, wherein said two or more series of yarn guides are of substantially equivalent length and extend substantially across the width of the apparatus.

4. Apparatus according to claim 2, wherein two or more of said series of yarn guides are of different length.

5. Apparatus according claim 1 wherein said series of yarn guides is carried by an endless flexible member.

6. Apparatus according to claim 5, wherein said endless flexible member is in the form of an endless chain or band extending around spaced sprockets or pulleys and wherein at least one of said spaced sprockets or pulleys is driven.

7. Apparatus according to claim 5, wherein said endless flexible member is in the form of an endless chain or band mounted on a guide rail and driven by a sprocket.

8. Apparatus according to claim 1 wherein said creel means comprises at least one rotatable creel support having means for mounting a plurality of creels about a periphery thereof.

9. Apparatus according to claim 8, wherein said rotatable creel support is in the form of a wheel, cylindrical frame or carousel.

10. Apparatus according to claim 1 wherein said stitching means comprises knitting means.

11. Apparatus according to claim 1 wherein said transport means comprises conveyor means.

12. Apparatus according to claim 1, wherein said collecting means comprises upper and lower driven roller extending across the width of the apparatus, said rollers each having pins extending outwardly of the periphery thereof, the pins of each roller extend between the pins of the other roller at a nip of said rollers.

13. Apparatus according to claim 1 comprising weft insertion means mounted on said stitching means.

14. Apparatus according to claim 13, wherein said weft insertion means comprises a weft insertion carriage reciprocatable across the width of the apparatus.

15. Apparatus for producing multi-axial non-woven fabric, the apparatus comprising a series of yarn guides having upper and lower reaches extending widthwise of the apparatus, means for driving said series of yarn guides whereby said upper and lower reaches travel in opposite directions, creel means for supplying yarns to said yarn guides, means for rotating said creel means in a substantially equivalent direction and speed as said series of yarn guides to prevent tangling of the yarns supplied to the yarn guides, collecting means for collecting the yarns issuing from said yarn guides and passing said collected yarns to stitching means extending across the width of the apparatus for stitching together the yarns laid by said yarn guides, said collecting means including upper and lower conveyor belts each having pins extending from an outer surface thereof and having opposed adjacent reaches which travel in a same direction and which are spaced apart a distance less than a length of the pins so that the pins of each said conveyor belt extend between the pins of the other conveyer belt in a region of said opposed adjacent reaches, and transport means for transporting the laid yarns through said stitching means.

16. Apparatus for producing multi-axial non-woven fabric, the apparatus comprising a series of yarn guides having upper and lower reaches extending widthwise of the apparatus, means for driving said series of yarn guides whereby said upper and lower reaches travel in opposite directions, creel means for supplying yarns to said yarn guides, means for rotating said creel means in a substantially equivalent direction and speed as said series of yarn guides to prevent tangling of the yarns supplied to the yarn guides, collecting means for collecting the yarns issuing from said yarn guides and passing said collected yarns to stitching means extending across the width of the apparatus for stitching together the yarns laid by said yarn guides, means for varying the speed at which said series of yarn guides is driven relative to the speed at which the laid yarns are transported through said stitching means to vary an angle at which the yarns are laid relative to a longitudinal centerline of fabric being formed, and transport means for transporting the laid yarns through said stitching means.

17. Apparatus according to claims 1, 15, or 16 comprising at least two series of said yarn guides of substantially equal length, whereby a fabric is produced in which all the layers are of substantially equal width.

* * * * *